(12) United States Patent
Nishibata et al.

(10) Patent No.: US 8,377,492 B2
(45) Date of Patent: Feb. 19, 2013

(54) DIETARY FIBER-ENRICHING AGENT AND DIETARY FIBER-ENRICHED FOOD

(75) Inventors: Toyohide Nishibata, Itami (JP); Kouichi Tashiro, Itami (JP); Shinya Suzuka, Itami (JP); Shozo Sugano, Itami (JP)

(73) Assignee: Matsutani Chemical Industries Co., Ltd., Hyogo (JP)

( * ) Notice: Subject to any disclaimer, the term of this patent is extended or adjusted under 35 U.S.C. 154(b) by 1026 days.

(21) Appl. No.: 12/253,050

(22) Filed: Oct. 16, 2008

(65) Prior Publication Data

US 2009/0104334 A1 Apr. 23, 2009

(30) Foreign Application Priority Data

Oct. 19, 2007 (JP) .................................. 2007-272200

(51) Int. Cl.
*A23L 1/0522* (2006.01)
(52) U.S. Cl. ........... 426/549; 426/653; 426/661; 536/47
(58) Field of Classification Search .................... None
See application file for complete search history.

(56) References Cited

U.S. PATENT DOCUMENTS

| | | | | |
|---|---|---|---|---|
| 4,235,939 | A * | 11/1980 | Kimberly, Sr. ................ | 426/549 |
| 5,110,612 | A | 5/1992 | Quarles et al. | |
| 5,480,669 | A | 1/1996 | Zallie et al. | |
| 5,855,946 | A | 1/1999 | Seib et al. | |
| 6,664,389 | B1 * | 12/2003 | Shi et al. ........................ | 536/102 |
| 7,910,150 | B2 | 3/2011 | Matsuda et al. | |
| 2006/0073186 | A1 * | 4/2006 | Kume et al. .................... | 424/439 |
| 2006/0178343 | A1 | 8/2006 | Shimotoyodome et al. | |
| 2006/0188633 | A1 * | 8/2006 | Matsuda et al. ............... | 426/549 |
| 2008/0095909 | A1 | 4/2008 | Tachibe et al. | |
| 2011/0091626 | A1 | 4/2011 | Tachibe et al. | |

FOREIGN PATENT DOCUMENTS

| | | |
|---|---|---|
| JP | 03-027234 A | 2/1991 |
| JP | 7-14331 B2 | 2/1995 |
| JP | 07-046976 A | 2/1995 |
| JP | 8-504583 A | 5/1996 |
| JP | 10-243777 A | 9/1998 |
| JP | 10-313804 A | 12/1998 |
| JP | 11-5802 A | 1/1999 |
| JP | 2002-503959 A | 2/2002 |
| JP | 2002-541831 A | 12/2002 |
| JP | 3530567 B2 | 3/2004 |
| JP | 2004-269458 A | 9/2004 |
| JP | 3798509 B2 | 4/2006 |
| JP | 2006-129790 A | 5/2006 |
| JP | 2006-254901 A | 9/2006 |
| JP | 4682117 B2 | 2/2011 |
| WO | 94/14342 A1 | 7/1994 |
| WO | 00/62631 A1 | 10/2000 |
| WO | 2005/029967 A1 | 4/2005 |

OTHER PUBLICATIONS

Resistantstarch.com. Dietary Fiber FAQ [online], [retrieved on Jul. 15, 2011]. Retrieved from Internet <URL: http://www.resistantstarch.com/ResistantStarch/Health+Focus/Fiber+benefits/Dietary+Fiber+FAQ.htm>.*
English machine-translation of JP 2006-129790.*
English machine-translation of JP 10-243777.*
B. M. N. Mohd. Azemi, et al, "In Vitro Digestibility of Hydroxypropyl Maize, Waxy Maize and High Amylose Maize Starches", Starch/Stärke, 1984, pp. 273-275, vol. 36, No. 8.
Tsuneo Kobayashi, "Susceptibility of Heat-Moisture-Treated Starches to Pancreatic α-Amylase, and the Formation of Resistant Starch by Heat-Moisture Treatment",Starch Science, 1993, pp. 285-290, vol. 40, No. 3.
Kiyoshi Ebihara, "In Vitro α-Amylase Hydrolysis of Modified Starch and Postprandal Plasma Glucose Response", Journal of Japanese Society of Nutrition and Food Science, 1992, pp. 551-553, vol. 45, No. 6.
M. Wootton, et al, "In Vitro Digestion of Hydroxypropyl Derivatives of Wheat Starch", Starch/Stärke, 1981, pp. 135-137, vol. 33, No. 4.
Kiyoshi Ebihara, et al, "Hydroxypropyl-Modified Potato Starch Increases Fecal Bile Acid Excretion in Rats", J. Nutr, 1998, pp. 848-854, vol. 128.
Tsuji, Food Fiber: New Development, New Food Industry, 1994, vol. 36, No. 8, pp. 1-6.
Okuma et al., "Development of Indigestible Dextrim", J. Appl. Glycosi., 2006, vol. 53, pp. 65-69.

* cited by examiner

*Primary Examiner* — Helen F Heggestad
(74) *Attorney, Agent, or Firm* — Sughrue Mion, PLLC

(57) ABSTRACT

The invention provides a water-soluble dietary fiber enriching agent comprising a modified starch which contains dietary fibers in an amount not more than 5% by mass measured by Prosky's method and a low-molecular weight water-soluble dietary fiber in an amount not less than 25% by mass. The water-soluble dietary fiber enriching agent contains a low-molecular weight water-soluble dietary fiber, and does not deteriorate the mouthfeel of the food obtained using the same.

7 Claims, No Drawings

DIETARY FIBER-ENRICHING AGENT AND DIETARY FIBER-ENRICHED FOOD

TECHNICAL FIELD

This invention relates to a dietary fiber-enriching agent and dietary fiber-enriched food, in particular, to a water-soluble dietary fiber-enriching agent comprising a modified starch which contains a low-molecular weight water-soluble dietary fiber, but no or very small amount of water-insoluble dietary fiber and high-molecular weight water-soluble dietary fiber, a dietary fiber-enriching agent comprising the starch and another starch containing a water-insoluble dietary fiber, and a food containing the same.

BACKGROUND ART

Dietary fibers are generic term referring to ingredients in foods that cannot be digested with human digestive enzymes. Because dietary fibers have various effects, they have been attracting attentions as "the sixth nutrient" in addition to the five major nutrients. Dietary fibers can roughly be divided into water-soluble dietary fibers (hereinafter referred to as SDF) and water-insoluble dietary fibers (hereinafter referred to as IDF). Since these soluble- and insoluble-dietary fibers exhibit different physiological functions in the body, respective values for both SDF and IDF are indicated in food composition tables. In addition, the total value for both fibers (SDF and IDF) is also displayed in food composition tables as the total content of all dietary fibers.

One example of physiological functions of dietary fibers is that SDF is known to be prone to fermentation in colon, so that the fermented products exhibit many different types of physiological functions. SDF can be divided into fermentable SDF and non-fermentable SDF depending on their fermentability in colon. The former is utilized by intestinal bacteria to generate short chain fatty acids in colon, which would then serve as energy sources for the intestinal tract, and gives chemical stimuli to the intestinal tract, giving rise to control the intestinal conditions such that bowel movement become improved. The latter increases the bowel volume, due to its water retentivity and gives physical stimuli to the intestinal tract, which then lead to improvement of Taxation. On the other hand, there are several reports focusing on IDF and its excretion stimulating effect. Further, it is known that increase of IDF intake suppresses onsets of colorectal cancer and diverticulosis of colon as a result of stimulating movement of the bowel content. Therefore, it is recognized that SDF and IDF are different in physiological functions, and hence, intake of these dietary fibers in a balanced manner appears to be of importance.

In view of such findings and increase of demand for health trend, resistant starch (hereinafter referred to as RS) products, which are starch raw materials with higher contents of dietary fibers, i.e., with increased resistance against digestive enzymes, are on the market from various manufacturers. Methods for providing enzyme-resistance to starch includes: process for cross-linking a starch by phosphate (Patent Document 1); treatment of a starch with heat-moisture (Patent Document 2, non-Patent Documents 1 and 2); and selecting and processing a starch with high amylose content (Patent Documents 3 and 4).

Gelatinization properties are characteristic for starch raw materials used in food, and such properties of these RS are significantly repressed. Therefore, grains of these RS do not swell even by heating in a slurry state. With the characteristics, RS can exhibit resistance against digestive enzymes. However, due to the characteristics, RS-added foods may often leave powdery or rough texture in the mouth. Further, it has been difficult to add viscosity such as thickness to foods using these RS products.

One of commonly used methods for measuring dietary fiber content in RS is AOAC method 985.29 (commonly referred to as Prosky's method). Although Prosky's method can detect IDF and SDF with high-molecular weight which become precipitated by treatment with alcohol (high-molecular weight water-soluble dietary fibers: HSDF), it cannot detect SDF with low-molecular weight which do not precipitate by alcohol treatment (low-molecular weight water-soluble dietary fibers: LSDF) due to the principle of measurement. One of the method which can detect such low-molecular weight SDF (LSDF) is AOAC method 2001.03, a method for quantitating dietary fibers containing indigestible dextrins. Therefore, LSDF content in a given sample can be identified by comparing the quantitative values obtained through these methods.

|  | IDF | HSDF | LSDF |
| --- | --- | --- | --- |
| Prosky's method | ○ | ○ | x |
| AOAC method 2001.03 | ○ | ○ | ○ |

○: counted in the quantitative value
x: not counted in quantitative value

Existing water-soluble dietary fibers includes pectic substances, vegetable gums (such as guar gums), viscous substances (such as mannan), and seaweed polysaccharides (such as alginic acid, laminarin and fucoidan). Addition of a pectic substance, guar gum, mannan or the like to food enhances effects on physical properties of dough and batter during food production, as well as effects on the shape and mouthfeel of the final product, depending on the volume to be added. Furthermore, because water-soluble dietary fibers have significant effect on properties and conditions of dough and batter, there was a difficulty in applying such fibers, without any modification, to food made by a process involving steps for producing dough or batter. When water-soluble and low-viscous dietary fibers are used in a process of making breads and confectioneries, which involve the step of expansion, they prevent the expansion which results in problems such as insufficient cooking of the final product or hardening of the surface thereof.

RS-containing noodle is disclosed as one type of RS-containing food latent Documents 5 and 6). The contents of dietary fibers in RS disclosed in these Documents are defined by Prosky's method, i.e. by the total amount of water-insoluble dietary fibers (IDF) and high-molecular weight water-soluble dietary fibers (HSDF), and the amount of low-molecular weight water-soluble dietary fiber (LSDF) is not mentioned therein.

Meanwhile, hydroxypropyl starch (hereinafter referred to as PO starch) and hydroxypropylated phosphate cross-linked starch (hereinafter referred to as PO cross-linked starch) are also known as RS other than those described above. For example, non-Patent Document 3 describes that PO cross-linked starch is less susceptible to alpha-amylase digestion compared to oxidized starch, acetylated phosphate cross-linked starch and dextrins. Non-Patent Document 4 discloses that PO starch acquires resistance against hydrolysis by porcine pancreatic alpha-amylase, depending on degree of substitution thereon. Further, Patent Document 7 describes that hydrolysates of PO starch have low calorie. Non-Patent Document 5 reports on increases in the amounts of bile acids and cholesterol to be excreted, hypertrophy of and pH reduction in cecum, and alteration of organic acid compositions in rat models fed with food containing either PO starch or PO cross-linked starch. Furthermore, Patent Document 8 discloses a water-soluble dietary fiber having low viscosity and a composition for dietary food enrichment containing PO starches with average degree of substitution between 0.02-0.2.

However, starches, in particular, PO starch and PO cross-linked starch have not yet been used as water-soluble dietary fiber enriching agents.

[Patent Document 1] U.S. Pat. No. 5,855,946 (JP-T-2002-503959)
[Patent Document 2] Japanese Patent No. 3530567
[Patent Document 3] JP-T-08-504583
[Patent Document 4] JP-A-11-5802
[Patent Document 5] Japanese Patent No.3798509
[Patent Document 6] JP-A-2006-129790
[Patent Document 7] JP-B-07-14331
[Patent Document 8] JP-A-10-243777
[Non-Patent Document 1] Mohd et al, Starch/Staerke, 36(8), 273-275, 1984
[Non-Patent Document 2] Starch Science, Vol. 40(3), Pages 285-290, 1993
[Non-Patent Document 3] Journal of Japanese Society of Nutrition and Food Science, Vol. 45(6), Pages. 551-553, 1992
[Non-Patent Document 4] M.Wootton et al, Starch/Staerke, 33(4), 135-137,1981
[Non-Patent Document 5] J. Nutr., 128, 848-854, 1998

DISCLOSURE OF THE INVENTION

Problems to be Solved by the Invention

An object of the invention is to provide a water-soluble dietary fiber enriching agent containing LSDF (low-molecular weight water-soluble dietary fiber) which has an intestinal condition controlling effect, such as improvement of Taxation, as well as a starch raw material which does not deteriorate the mouthfeel. Another object of the invention is to provide a dietary fiber enriching agent which employs a well balanced combination of a starch raw material with high LSDF content and another starch raw material with high IDF content. Yet another object of the invention is to provide a food which contains any of the dietary fiber enriching agents described above.

Means to Solve the Problems

The above mentioned problems can be solved by using a modified starch having a high content of low-molecular weight water-soluble dietary fiber (LSDF). The present inventors have discovered that certain types of modified starch have a high content of low molecular-weight water-soluble dietary fiber (LSDF), which are hardly digested with digestive enzymes, while containing little IDF. Further, the present inventors have also discovered that foods containing these modified starches avoid rough texture or poor dissolution in the mouth, hence, accomplished the present invention.

Therefore, the present invention provides the followings:
1. A water-soluble dietary fiber enriching agent comprising a modified starch A, wherein the modified starch A contains a water-insoluble dietary fiber (IDF) plus high-molecular weight water-soluble dietary fiber (HSDF) in a total amount not more than 5% by mass, and a low-molecular weight water-soluble dietary fiber (LSDF) in an amount not less than 25% by mass.
2. The water-soluble dietary fiber enriching agent according to the above item 1, wherein the LSDF is in an amount not less than 35% by mass.
3. The water-soluble dietary fiber enriching agent according to the above item 1, wherein the LSDF is in an amount not less than 45% by mass.
4. The water-soluble dietary fiber enriching agent according to the above item 1, wherein the LSDF is in an amount not less than 55% by mass.
5. The water-soluble dietary fiber enriching agent according to any one of the above items 1 to 4, wherein the modified starch A is at least one selected from the group consisting of hydroxypropyl starch and hydroxypropylated phosphate cross-linked starch.
6. A dietary fiber enriching agent comprising modified starches A and B, wherein the modified starch A contains a water-insoluble dietary fiber (IDF) plus high-molecular weight water-soluble dietary fiber (HSDF) in a total amount not more than 5% by mass, and a low-molecular weight water-soluble dietary fiber (LSDF) in an amount not less than 25% by mass, and the modified starch B contains IDF in an amount not less than 30% by mass, and LSDF in an amount not more than 5% by mass.
7. The dietary fiber enriching agent according to the above item 6, wherein the mass ratio between the modified starches A and B is from 10:90 to 90:10.
8. The dietary fiber enriching agent according to the above item 6 or 7, wherein the modified starch B is at least one selected from the group consisting of phosphate cross-linked and heat-moisture treated starch.
9. A food containing the dietary fiber enriching agent according to any one of the above items 6 to 8.
10. The food according to the above item 9, which is in the form of a bakery product or a noodle product.

Effects of the Invention

The water-soluble dietary fiber enriching agent according to the invention provides a convenient supply of SDF, in particular, of LSDF, since the agent can be mixed in a variety of food products including bakery products and noodles. In addition, the water-soluble dietary fiber enriching agent according to the invention provides a food product well balanced in SDF and IDF, in particular, in LSDF and IDF, because the agent can be used in combination with known IDF sources such as phosphate cross-linked starch and heat-moisture treated starch without producing a poor gelatinization property and rough texture of the food product.

BEST MODES FOR CARRYING OUT THE INVENTION

In the present invention, the total amount of IDF+HSDF is a value which is measured by Prosky's method, and the total amount of IDF+HSDF+LSDF is a value which is measured by AOAC method 2001.03 whereas LSDF is a value which is calculated from both of these measured values. IDF content can be determined by fractionating the reaction solution into insoluble and soluble fractions via filtration upon completion of the enzymatic reaction, and measuring the mass of the insoluble fraction. HSDF is a value obtained by subtracting the value of IDF from that of IDF+HSDF.

The modified starch A used in the invention is a starch to which a substituent group has been introduced via etherification or esterification on the starch raw material. The raw material for the modified starch A is not restricted. For example, the raw material can be selected from wheat, tapioca, potato, corn, sago, bean, waxy corn, rice, glutinous rice and the like, and one or more of these can be used.

The method for modifying is not restricted as long as a product contains dietary fibers (IDF+HSDF) in an amount not more than 5% by mass measured by Prosky's method and a low-molecular weight water-soluble dietary fiber (LSDF) in an amount not less than 25% by mass. An example of such method includes a treatment of starch either by etherification or both etherification and cross-linking in combination with one or more of pregelatinization, oxidization, alkaline hydrolysis, enzyme treatment and emulsification.

The modified starch A used in the invention contains dietary fibers (IDF+HSDF) in an amount not more than 5% by mass measured by Prosky's method and a low-molecular weight water-soluble dietary fiber (LSDF) in an amount not less than 25% by mass, preferably not less than 35% by mass, more preferably not less than 45% by mass, and most preferably not less than 55% by mass. Consequently, the modified starch A contains LSDF in an amount not less than ¼ of the total mass, and almost no HSDF.

PO starch or PO cross-linked starch is preferable for the modified starch A having such dietary fiber contents. PO starch can be made by allowing propylene oxide to react with any starch. PO cross-linked starch can be produced, for example, by adding a phosphorylation step using phosphorous oxychloride to a process for PO starch production prior to the step of reacting propylene oxide with the starch.

Thus obtained modified starch A is converted to LSDF (low-molecular weight water-soluble dietary fiber) by the action of a digestive enzyme in the body while still being a starch, and therefore, can be used as a water-soluble dietary fiber enriching agent. Such a water-soluble dietary fiber enriching agent is especially useful for food products to which water-soluble dietary fibers such as indigestible dextrin can hardly be applied as they are, such as bakery products and noodles.

Although the water-soluble dietary fiber enriching agent according to the invention comprises the modified starch A, it may include other additives such as some other dietary fibers, carbohydrates, proteins, vitamins, minerals and the like. The water-soluble dietary fiber enriching agent according to the invention contains the modified starch A in an amount preferably not less than 60% by mass, more preferably not less than 80% by mass, and most preferably 100% by mass.

The dietary fiber enriching agent according to the invention comprises modified starches A and B, wherein the modified starch B contains IDF in an amount not less than 30% by mass, and LSDF in an amount not more than 5% by mass. Preferably, the modified starch B contains IDF in an amount not less than 60% by mass, and more preferably not less than 80% by mass.

The modified starch B with a high IDF content includes, for example, phosphate cross-linked starch and heat-moisture treated starch.

The modified starches A and B can be used together in combination as a dietary fiber enriching agent which displays excellent and well balanced physiological functions, wherein SDF, especially LSDF provides intestinal condition controlling effects including improvement of Taxation, and improves mouthfeel while IDF stimulates evacuation and bowel content movement.

The mass ratio between the modified starches A and B is preferably from 10:90 to 90:10, and more preferably from 30:70 to 70:30.

The manners in which the water-soluble dietary fiber enriching agent comprising the modified starch A and the dietary fiber enriching agent comprising the modified starches A and B according to the invention are used are not restricted, but usually these agents may be mixed with a food product at any step of production so that such agents are contained in an amount of 2-20% by mass per food product. In case where cereal flour such as wheat flour is used as a raw material, the enriching agent of the invention may be added by replacing a portion of such cereal flour.

Among food products to which the water-soluble dietary fiber enriching agent comprising the modified starch A and the dietary fiber enriching agent comprising the modified starches A and B according to the invention can be applied, bakery products and noodles are most preferable.

A bakery product used herein is one prepared by a process comprising the steps of adding at least water, salt and/or a foaming agent to cereal flour materials containing wheat flour as a main ingredient, and if necessary, other cereal flour such as whole grain, rye flour, corn flour, buckwheat flour and rice flour to form a dough or batter; and heat cooking them, and forming foams therein to some extent with yeast, baking powder, whole egg, egg white and the like prior to or during cooking. The bakery product contains approximately 2-50% of water. Examples of the bakery product includes those baked in ovens, for example, pain de mie such as Pullman bread, English bread and one-loaf, French breads such as baguette and Parisian, various types of bread rolls such as sweet roll, buns and table roll, as well as sweet bun such as bun filled with bean paste and melonpan, various types of Danish pastries such as croissant, English muffins, bagels, sponge cakes, biscuits, crackers, pizza, naan, those fried with oils such as doughnut and fritter, those cooked with steam such as steamed cake and steamed bread.

Supplementary ingredients used herein refers to ingredients commonly used for production of bakery products, including, for example, carbohydrates, dairy products, fats and oils, emulsifiers, flavors, spices, artificial sweetener, coloring agents, liquors, dried fruits such as raisin, nuts and cocoa powders.

The water-soluble dietary fiber enriching agent comprising the modified starch A and the dietary fiber enriching agent comprising the modified starches A and B according to the invention can also be applied to refrigerated or frozen dough which has recently been utilized for improving efficiencies of production and distribution of bakery products. Further, the present invention can be applied to food products that can be produced by subjecting the above described food products to a secondary process, such as bread crumb and rusk.

Noodle products used herein include noodles such as udon, soba, Chinese noodles, macaroni, spaghetti, barley noodles, barley-buckwheat noodles, cold noodle and rice powder noodle, as well as skins for jiaozi, wonton, Spring rolls, Shaomai and the like. Such noodles may be either uncooked, dried or instant noodle.

EXAMPLES

The present invention will be described more in detail by way of following Reference Examples, Experimental Examples and Examples. It should be noted that "part(s)" indicates "part(s) by mass".

Reference Example 1

To 130 parts of water, 20 parts of sodium sulfate and 100 parts of potato starch were added to prepare a slurry. Then, 30 parts of aqueous caustic soda solution (3% by mass) and 0.1 part of phosphorous oxychloride were added to the slurry under stirring and the resulting mixture was allowed to react at 40° C. for 1 hour. To the resulting preparation, 10 parts of propylene oxide was added and allowed to react at 40° C. for 20 hours, and then the resulting mixture was neutralized with hydrochloric acid, washed with water, dehydrated and dried to obtain Starch No.1 (hydroxypropylated phosphate cross-linked starch). Dietary fiber was not detected in Starch No.1 by Prosky's method, whereas the content of low-molecular weight water-soluble dietary fiber was 51.7% by mass.

Reference Example 2

Starch No.2 (hydroxypropylated phosphate cross-linked starch) was obtained by the same reactions described in Reference Example 1, except that the potato starch was replaced with tapioca. Dietary fiber content in Starch No.2 detected by Prosky's method was 1.02% by mass, whereas the content of low-molecular weight water-soluble dietary fiber was 40.3% by mass.

Reference Example 3

To 130 parts of water, 30 parts of sodium sulfate and 100 parts of corn starch were added to prepare a slurry. Then, 33 parts of aqueous caustic soda solution (3% by mass) was added to the slurry under stirring together with each of 7 parts, 10.5 parts and 14 parts of propylene oxide respectively, and each of the resulting mixtures was allowed to react at 40° C. for 20 hours, followed by neutralization with hydrochloric acid, washing with water, dehydration and drying to obtain hydroxypropyl starches, Starches No.3, No.4 and No.5, respectively. Dietary fiber was not detected in Starches Nos.3-5 by Prosky's method whereas the contents of low-molecular weight water-soluble dietary fiber were 37.5% by mass, 49.3% by mass and 56.5% by mass, respectively.

Reference Example 4

Starches No.6, No.7 and No.8 were obtained, by the same treatment described in Reference Example 3 with each of 7 parts, 10.5 parts and 14 parts of propylene oxide added, respectively, except that the raw starch was replaced with waxy corn starch. Dietary fiber was not detected in Starches Nos.6-8 by Prosky's method whereas the contents of low-molecular weight water-soluble dietary fiber were 43.3% by mass, 53.2% by mass and 60.2% by mass, respectively.

Reference Example 5

To 140 parts of water, 10 parts of sodium sulfate and 100 parts of wheat starch were added to prepare a slurry. After addition of aqueous caustic soda solution (3% by mass) to the slurry under stirring, 7 parts of sodium trimetaphosphate was added thereto under stirring while maintaining pH11.1-11.5, and the resulting mixture was allowed to react at 45° C. for 17 hours. The resulting mixture was neutralized with hydrochloric acid, washed with water, dehydrated and dried to obtain Control Starch No.1 (cross-linked starch). The content of dietary fibers measured by Prosky's method was 84.2% by mass and all of which were IDF. No low-molecular weight water-soluble dietary fiber was detected.

Reference Example 6

Control Starch No.2 (cross-linked starch) was obtained by the same reactions described in Reference Example 5, except that the amount of water used was 130 parts and the wheat starch was replaced with high-amylose corn starch. The content of dietary fibers measured by Prosky's method was 93.5% by mass and all of which were IDF. No low-molecular weight water-soluble dietary fiber was detected.

Reference Example 7

High-amylose corn starch was autoclaved at 120° C. for 60 minutes to obtain Control Starch No.3 (heat-moisture treated starch). The content of dietary fibers measured by Prosky's method was 68.9% by mass and all of which were IDF. No low-molecular weight water-soluble dietary fiber was detected.

Control Starches Nos.4 and 5 were obtained by pregelatinizing commercially available hydroxypropylated phosphate cross-linked starches derived from corn and tapioca, respectively. The contents of dietary fibers measured by Prosky's method were 19.2% by mass for No.4 and 11.9% by mass for No.5, and all of which were IDF. No low-molecular weight water-soluble dietary fiber was detected.

The results are summarized in Table 1.

TABLE 1

| Starch No. | Dietary Fiber Content (% by mass) | | |
|---|---|---|---|
| | IDF | HSDF | LSDF |
| Starch No. 1 | 0 | 0 | 51.7 |
| Starch No. 2 | 1.02 | 0 | 40.3 |
| Starch No. 3 | 0 | 0 | 37.5 |
| Starch No. 4 | 0 | 0 | 49.3 |
| Starch No. 5 | 0 | 0 | 56.5 |
| Starch No. 6 | 0 | 0 | 43.3 |
| Starch No. 7 | 0 | 0 | 53.2 |
| Starch No. 8 | 0 | 0 | 60.2 |
| Control Starch No. 1 | 84.2 | 0 | 0 |
| Control Starch No. 2 | 93.5 | 0 | 0 |
| Control Starch No. 3 | 68.9 | 0 | 0 |
| Control Starch No. 4 | 19.2 | 0 | 0 |
| Control Starch No. 5 | 11.9 | 0 | 0 |

Examples 1-2

Japanese anman (bun with bean paste filling) was made according to a conventional method using nikuman (Chinese steamed bread) dough composition shown in Table 2. Each of the following items was evaluated for the Japanese anman by seven panelists in ten grades (from grade 1: "worst" to 10: "best"): mixing property, state of dough at time being shaped, appearance and internal phase of the product, taste of the product, smoothness of the product, softness and dissolution in mouth of the product. The results are shown in Table 3

The product of Example 1 obtained higher evaluation with respect to ease of handling of dough through production, smoothness and dissolution in mouth of the product, compared to that of Reference Example (Control Starch No.1 was used). Further, the product of Example 1 was evaluated to have production suitability and product quality comparable to those of Control Examples wherein dietary fibers were not used, and therefore appeared to be quite favorable as a dietary fiber source.

In Example 2, the starch containing a low-molecular weight water-soluble dietary fiber (Starch No. 2) was used in combination with the starch (Control Starch No. 1) in which all of the dietary fibers, the content of which measured by Prosky's method was 84.2% by mass, were IDF. As a result of the combination use, the product of Example 2 was evaluated to have superior production suitability and product quality compared to those of Control Examples wherein dietary fibers were not used.

TABLE 2

|  | Example 1 | Example 2 | Reference Example | Control Example |
|---|---|---|---|---|
| Special grade strong flour | 25 parts | 25 parts | 25 parts | 25 parts |
| Special grade soft flour | 45 parts | 45 parts | 45 parts | 75 parts |
| Starch No. 2 | 30 parts | 15 parts | | |
| Control Starch No. 1 | | 15 parts | 30 parts | |
| Subtotal | 100 parts | 100 parts | 100 parts | 100 parts |
| White superior soft sugar | 10 parts | 10 parts | 10 parts | 10 parts |
| Baking powder *1 | 0.5 part | 0.5 part | 0.5 part | 0.5 part |
| Salt | 0.1 part | 0.1 part | 0.1 part | 0.1 part |
| Dry yeast *2 | 1.5 part | 1.5 part | 1.5 part | 1.5 part |
| Water | 45.0 parts | 45.0 parts | 45.0 parts | 45.0 parts |
| Lard | 10.0 parts | 10.0 parts | 10.0 parts | 10.0 parts |
| Total | 167.1 parts | 167.1 parts | 167.1 parts | 167.1 parts |

*1: TOP BAKING POWDER DX (Okuno Chemical Industries Co., Ltd., Japan)
*2: SUPER KAMERIA DRY YEAST (Nisshin Foods Inc., Japan)

TABLE 3

|  | Example 1 | Example 2 | Reference Example | Control Example |
|---|---|---|---|---|
| Mixing property | 8 | 10 | 5 | 8 |
| State of dough at time being shaped | 8 | 10 | 5 | 8 |
| Appearance and internal phase | 7 | 10 | 6 | 8 |
| Taste | 8 | 10 | 4 | 9 |
| Smoothness | 10 | 10 | 4 | 8 |
| Softness and dissolution in mouth | 6 | 10 | 5 | 7 |
| Total | 47 | 60 | 29 | 48 |

Example 3

According to a general mixing procedure, each product for bun, croissant and cake doughnut was made on an experimental basis by replacing 30% by mass of raw wheat flour with Starch No.1. All the products showed excellent qualities for smoothness and dissolution in mouth.

Example 4

An aqueous solution in which 2 parts of salt was dissolved in 33 parts of water was added to a raw flour consisting of 40 parts of buckwheat flour, 50 parts of strong wheat flour and 10 parts of Starch No. 2 and the resulting mixture was kneaded to make a noodle dough. The kneaded noodle dough was formed into a noodle sheet in 1.3 mm thickness through a noodle making roller and the sheet was sliced with a No. 20 cutting blade to make uncooked soba. The obtained uncooked soba was boiled in boiling water for 2 minutes and the boiled soba was subjected to evaluation. A control product prepared in the same manner except that a raw flour consisting of 30 parts of buckwheat flour and 70 parts of wheat flour was used for comparison. As a result, the product of Example 4 displayed the same appearance as the control product, and had slightly glutinous texture and excellent crispness compared to the control product.

What is claimed is:

1. A water-soluble dietary fiber enriching agent comprising modified starches A and B, wherein
    (i) the modified starch A is a hydroxypropylated phosphate cross-linked starch and contains a water-insoluble dietary fiber (IDF) plus high-molecular weight water-soluble dietary fiber (HSDF) in a total amount not more than 5% by mass as determined by the AOAC method 985.29, and a low-molecular weight water-soluble dietary fiber (LSDF) in an amount not less than 25% by mass as determined by subtracting the value as determined by the AOAC method 985.29 from that of the total dietary fiber as determined by the AOAC method 2001.03, and
    (ii) the modified starch B contains an IDF in an amount not less than 30% by mass, and a low-molecular weight water-soluble dietary fiber (LSDF) in an amount not more than 5% by mass as determined by subtracting the value as determined by the AOAC method 985.29 from that of the total dietary fiber as determined by the AOAC method 2001.03,
wherein the modified starch B is at least one selected from the group consisting of phosphate cross-linked starch and moist heat-treated starch.

2. The water-soluble dietary fiber enriching agent according to claim 1, wherein the modified starch A contains the LSDF in an amount not less than 35% by mass.

3. The water-soluble dietary fiber enriching agent according to claim 1, wherein the modified starch A contains the LSDF in an amount not less than 45% by mass.

4. The water-soluble dietary fiber enriching agent according to claim 1, wherein the modified starch A contains the LSDF in an amount not less than 55% by mass.

5. The dietary fiber enriching agent according to claim 1, wherein the mass ratio between the modified starches A and B is from 10:90 to 90:10.

6. A food containing the dietary fiber enriching agent according to claim 1.

7. The food according to claim 6, which is a bakery product.

* * * * *